(12) United States Patent
Saitoh

(10) Patent No.: US 6,382,221 B2
(45) Date of Patent: May 7, 2002

(54) PARTICULATE MATTER WASHING METHOD

(75) Inventor: Yasuhiro Saitoh, Kawasaki (JP)

(73) Assignee: Nihon Genryo Co., Ltd., Kawasaki (JP)

( * ) Notice: Subject to any disclaimer, the term of this patent is extended or adjusted under 35 U.S.C. 154(b) by 0 days.

(21) Appl. No.: 09/832,264

(22) Filed: Apr. 10, 2001

Related U.S. Application Data

(63) Continuation-in-part of application No. 09/299,341, filed on Apr. 26, 1999, which is a continuation-in-part of application No. 08/936,941, filed on Sep. 23, 1997, now abandoned.

(30) Foreign Application Priority Data

| Oct. 4, 1996 | (JP) | 8-283301 |
| Aug. 23, 1997 | (JP) | 9-242035 |

(51) Int. Cl.[7] ................................ B08B 3/04
(52) U.S. Cl. .................. 134/25.5; 134/32; 134/10; 134/25.1
(58) Field of Search .................. 134/65, 131, 132, 134/201, 42, 10, 25.1, 25.5, 32

(56) References Cited

U.S. PATENT DOCUMENTS

| 1,478,073 | A |  | 12/1923 | VanKuren | 366/309 |
| 1,564,187 | A |  | 12/1925 | Ahrens |  |
| 2,061,089 | A |  | 11/1936 | Rheinstrom |  |
| 2,190,072 | A | * | 2/1940 | Keys |  |
| 2,491,194 | A | * | 12/1949 | McShea |  |
| 2,509,543 | A |  | 5/1950 | Traux | 366/319 |
| 2,626,856 | A |  | 1/1953 | Alles |  |
| 2,632,720 | A | * | 3/1953 | Perry |  |
| 2,744,066 | A | * | 5/1956 | Spiess, Jr. et al. |  |
| 2,745,888 | A | * | 5/1956 | Mertes et al. |  |
| RE24,281 | E |  | 2/1957 | Jones et al. |  |

(List continued on next page.)

FOREIGN PATENT DOCUMENTS

| CA | 541483 | * | 10/1954 |  |
| CA | 918542 | * | 1/1973 |  |
| DE | 1 442 453 |  | 3/1969 |  |
| DE | 231 199 |  | 12/1985 |  |
| DE | 525 348 |  | 2/1993 |  |
| DE | 94 02 821.4 |  | 6/1994 |  |
| DE | 43 28 151 A1 |  | 2/1995 |  |
| GB | 742784 | * | 1/1956 |  |
| GB | 1 404 163 |  | 8/1975 |  |
| JP | 43-735 |  | 1/1968 |  |
| JP | 61-204048 |  | 9/1986 |  |
| JP | 61-204049 |  | 9/1986 |  |
| JP | 08-196936 |  | 8/1996 |  |
| NL | 66-413 |  | 8/1950 | 134/32 |
| SU | 1271567 |  | 11/1986 |  |
| SU | 1577836 |  | 7/1990 |  |

*Primary Examiner*—Frankie L. Stinson
(74) *Attorney, Agent, or Firm*—Flynn, Thiel, Boutell & Tanis, P.C.

(57) ABSTRACT

In a method of washing contaminated particulate matter, a screw conveyor is disposed in a cleaning tank for rotation around a substantially vertical axis so that the lower part of the screw conveyor is positioned under the surface of the cleaning water and the upper part of the screw conveyor is positioned above the surface of the cleaning water. Under the surface of the water, the grains of the particulate matter are contacted with each other with sludge being interposed therebetween to remove at least a part of contamination substances from the surface of the grains of the particulate matter and to wash off the substances into the water. Above the surface of the water, the particulate matter is fluidized on the surface of the screw conveyor, thereby contacting the grains of the particulate matter with each other with a slight amount of the water including the sludge being interposed therebetween to remove at least a part of the remaining contamination substances from the surface of the grains of the particulate matter. The particulate matter, which has been raised, is allowed to fall down to the lower part of the screw conveyor through a way outside the screw conveyor.

15 Claims, 6 Drawing Sheets

U.S. PATENT DOCUMENTS

| | | | |
|---|---|---|---|
| 2,918,070 A | * 12/1959 | Carrier et al. | |
| 2,954,790 A | * 10/1960 | Kaether | |
| 3,117,031 A | * 1/1964 | Griffiths | |
| 3,248,180 A | 4/1966 | Kilpatrick | 366/319 |
| 3,544,369 A | * 12/1970 | Keogh, Jr. | |
| 3,618,922 A | 11/1971 | Crans | |
| 3,639,172 A | * 2/1972 | Jeogh, Jr. | |
| 4,022,638 A | * 5/1977 | Weet | |
| 4,101,116 A | 7/1978 | Haag et al. | 366/366 |
| 4,106,705 A | * 8/1978 | Nakamura | |
| 4,217,917 A | * 8/1980 | Kipelainen | |
| 4,376,693 A | * 3/1983 | Warzel | |
| 4,606,774 A | * 8/1986 | Morris | |
| 4,968,349 A | 11/1990 | Virtanen | 366/266 |
| 5,054,506 A | 10/1991 | Shakeri | |
| 5,316,029 A | 5/1994 | Campbell et al. | |
| 5,505,217 A | 4/1996 | Takagi et al. | |
| 5,641,397 A | 6/1997 | Grienberger | |

\* cited by examiner

F I G. 7
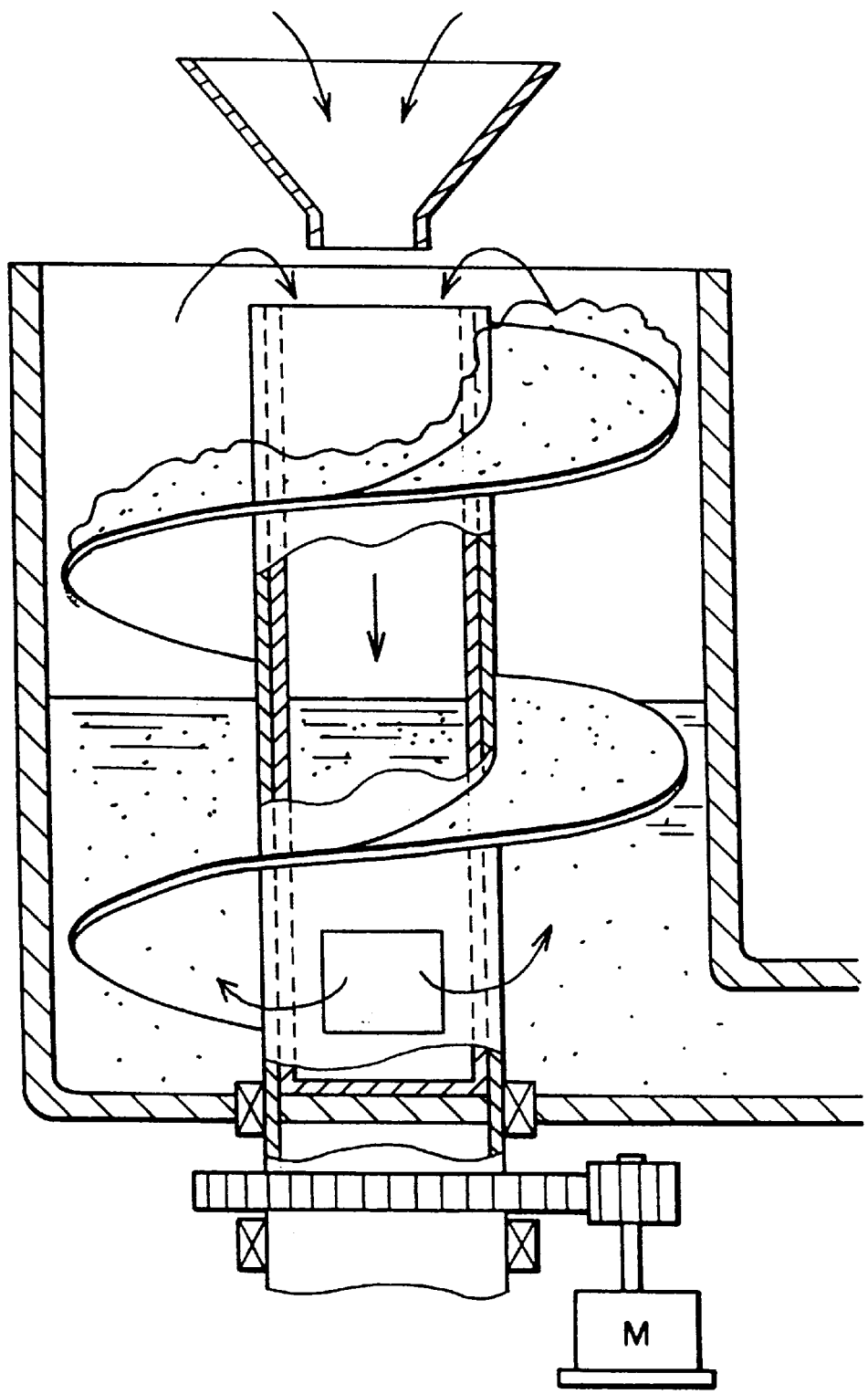

PARTICULATE MATTER WASHING METHOD

This is a divisional of Ser. No. 09/299,341, filed Apr. 26, 1999, which is a continuation-in-part of U.S. Ser. No. 08/936,941 filed Sep. 23, 1997, now abandoned.

BACKGROUND OF THE INVENTION

1. Field of the Invention

The present invention relates to a particulate matter washing apparatus or method for washing contaminated particulate matter scraped up from filtering media in a filtering pond or from a bottom of a waste water pond or a sedimentation basin, etc., or surface-covering sand to remove muck on or materials covering the surface of the grains of the particulate matter.

2. Description of the Prior Art

Filtering sand used in a water purifying plant is collected from a river bottom or a river-mouth, but a quantity of the resource is limited, so that sand once used is again used after cleaning or other similar processing. In association with rapid contamination of resource water or under influence caused by contaminants flowing into a filtering pond, such phenomena have been observed as that a grain diameter of the filtering material has become larger due to deposition of sludge or that sludge is separated from the filtering media when a grain diameter of filtering media becomes larger as described above, a space between the filtering media is reduced and the filtering efficiency becomes lower. So it is required to periodically take out the filtering media from the filtering pond and remove muck from a surface of the filtering media by means of washing.

Conventionally, in the processing for washing filtering media, generally there has been used a washing apparatus having agitation vanes to mix contaminated sand and cleaning water and agitate the mixture, but when a large quantity of contaminated sand is forcefully agitated, the sand grains are pulverized due to collision with the agitation vanes or friction between the filtering media themselves, and resultantly a portion which can not be recycled increases, and further if a quantity of cleaning water is small, the separated contaminants are again deposited on the sand grains, which makes it difficult for us to expect high efficiency in the processing for cleaning.

Also as the so-called washing apparatus for sand, there has been proposed an apparatus having a sand scrape-up section at a central position of the basic body for agitating and washing sand by making use of rotation of a screw conveyor provided in the sand scrape-up section. This sand washing apparatus is an apparatus used mainly for removing salt deposited on a surface of sea sand, and has the construction in which the screw conveyor has sand scrape-up vanes in its lower section and also agitation vanes on its upper section and blades for distribution are provided in the upper section of the sand scrape-up section.

In this type of sand washing apparatus as described above, sand put in a cleaning tank is raised due to effect by sand scrape-up vanes up to the agitation vane section, where the sand is mixed with cleaning water poured thereinto, the sand in the cleaning water is agitated, diluted, washed, and further raised upward by making use of rotation of agitation vanes, and then the sand is homogenized and forcefully moved from the sand scrape-up section to the cleaning tank. Because of this construction, it is required to inject sand into the cleaning tank up to at least a height of the blades for distribution, and further the cleaning water is supplied at a section where the agitation vanes rotate and salty water after cleaning is overflown from a water discharge pipe provided in the upper section of the cleaning tank, so that the cleaning tank is always required to be filled with the cleaning water.

As described above, generally the conventional type of sand washing apparatus has the configuration in which sea sand filling a tank is floated in and agitated with cleaning water to make salt deposited on a surface of sand grain dissolved in the cleaning water to acquire cleaned sand.

Even if filtering media is washed by using the conventional type of sand washing apparatus as described above, however, contaminants deposited on a gain surface are, different from salt, not dissolved into cleaning water, so that it has been impossible to expect a high cleaning effect. Also, when a supply rate of cleaning water is lowered to suppress floating of sand to be cleaned, as a large quantity of contaminated sand is forcefully agitated by the agitation vanes, which sometimes causes breakage pulverization of sand gains. Also as the sand scrape-up vanes and agitation vanes continue to rotate in the sand, so that friction between the agitation vanes and sand is disadvantageously large.

It is an object of the present invention to provide a sand washing apparatus which can effectively remove contaminants despited on and covering a surface of sand gain without pulverizing the injected sand and also in which wearing is generated little in the agitation member.

SUMMARY OF THE INVENTION

To solve the problems as described above, the present invention provides a method of washing contaminated particulate matter comprising:

providing a cleaning tank, for storing the contaminated particulate matter and cleaning water, in which the contaminated particulate matter and the cleaning water are contained in their respective predetermined amounts and in which a screw conveyor is disposed for rotation around a substantially vertical axis so that the lower part of the screw conveyor is positioned under the surface of the cleaning water contained in the cleaning tank and the upper part of the screw conveyor is positioned above the surface of the cleaning water in the cleaning tank;

contacting, under the surface of the water, the grains of the particulate matter with each other with sludge, which comes from the contaminated particulate matter and is present in the water, being interposed therebetween to remove at least a part of contamination substances from the surface of the grains of the particulate matter and to wash off the substances into the water, while raising the particulate matter and the water by means of the rotation of the screw conveyor under the surface of the water;

fluidizing, above the surface of the water, the particulate matter on the surface of the screw conveyor and thereby contacting the grains of the particulate matter with each other with a slight amount of the water including the sludge being interposed therebetween to remove at least a part of the remaining contamination substances from the surface of the grains of the particulate matter; and allowing the particulate matter, which has been raised, to fall down to the lower part of the screw conveyor through a way outside the screw conveyor;

whereby the contaminated particulate matter is cleaned off by way of repeating the raising and falling.

When the particulate mater is allowed to fall down, it is preferable to drop the particulate matter onto the surface of the water in the cleaning tank in order to avoid collision of the grains of the particulate matter with each other so that the grains of the particulate matter can be prevented from breaking or smashing into pieces.

It is preferable that the cleaning water is not replaced until the washing of the particulate mater is completed, but a part of the water may be replaced with unused water during the washing of the particulate matter. The presence of the sludge in the cleaning water provides better results in washing the particulate matter.

The surface of the water in the cleaning tank is preferably maintained at a height ranging from ½ to ⅔ of the height of the screw conveyor. The weight ratio of the particulate matter to the water in the cleaning tank may be set to be between 1.0:1 and 4.5:1 if it is desired. The screw conveyor is preferably rotated at a speed such that the water can be raised to the top of the screw conveyor.

Examples of the particulate matter as used herein include sand, particles of various kinds of minerals including zeolite, ion-exchange resins, scraps or debris of plastics or metals, such as those for recycling use, fine copper particles or powder obtained from etching waste liquid, and any other particulate substances.

The present invention also provides a particulate matter washing apparatus comprising:

a cleaning tank for storing particulate matter and cleaning water;

a screw conveyor with a cylindrical wall surrounding the conveyor, said screw conveyor being adapted for rotation around a substantially vertical axis in the cleaning tank;

a rotation mechanism for rotating the screw conveyor at a speed so that the particulate matter and the water are raised, in the lower part of the screw conveyor under the surface of the water, by means of the rotation of the screw conveyor, whereby at least a part of contamination substances on the particulate matter are removed by the contact between the grains of the particulate matter with the cleaning water being interposed therebetween, and so that the particulate matter is fluidized on the surface of the screw conveyor in the upper part of the screw conveyor above the surface of the water to remove at least a part of the remaining contamination substances from the particulate matter by means of the contact between the grains of the particulate matter; and a particulate matter circulating mechanism in which the particulate matter that has been raised is allowed to fall down to the lower part of the screw conveyor through a way outside the screw conveyor and is allowed to be raised again by the screw conveyor.

A gap between the outside periphery of the screw conveyor and the cylindrical wall surrounding the screw conveyor is preferably not less than three times as large as the particle size of the grains of the particulate matter.

In one embodiment of the present invention, the side wall of the cleaning tank constitutes the cylindrical wall surrounding the screw conveyor, and a circulating path making up the particulate matter circulating mechanism is provided outside the side wall, as shown in FIG. 6.

In another embodiment of the present invention, the side wall of the cleaning tank constitutes the cylindrical wall surrounding the screw conveyor, and a circulating path making up the particulate matter circulating mechanism is provided inside the side wall, as shown in FIG. 7.

A plurality of relatively small vanes may be provided substantially in parallel with, and between, adjacent relatively large vanes of the screw conveyor. The relatively small vanes are preferably wing-shaped. It is also preferable that the relatively small vanes are fixed to supporting bars which are provided in erect posture on the relatively larger vanes of the screw conveyor. It is further preferable that the cross-section of the supporting bars is wing-shaped with being thinner toward the direction of rotation of the screw conveyor.

In another aspect of the present invention, the particulate matter washing apparatus comprises a cleaning tank having a sand inlet port in its upper section and a sand outlet port in its lower section for storing therein sand and cleaning water; an agitation tank provided in the erected posture and having openings in its upper and lower edge sections; and a screw conveyor rotating in this agitation tank, and the screw conveyor projects from a top surface of a layer of sand deposited within the agitation tank as well as form a top surface of the cleaning water, and has a fluidized sand up-flow section for flowing the fluidized sand to be washed up to the upper opening section of the agitation tank.

Quantities of sand and cleaning water to be injected into the cleaning tank are set to levels so that an upper half of the screw conveyor projects from the sand and water within the agitation tank. When the screw conveyor is rotated, the sand and cleaning water gradually supplied from the lower opening section of the agitation tank goes up along the spiral vane. Then, by setting rpm of the screw conveyor to a high value so that the sand and water stored in the tank can go up to an upper edge of the vane, fluidization of the sand can be realized, and in this state sand gains collide to and scrub each other in the up-flowing water. It is necessary to set the rotational speed so that the fluidized sand is discharged from the agitation tank into the cleaning tank.

Deposited sand and cleaning water there are pushed up in the state where they are restricted by the screw conveyor, so that their free movement is suppressed, but in the fluidized sand up-flow section there is no restriction by the screw conveyor, so that cleaning water continues to flow upward actively moving. Then the fluidized sand forms a discontinuous eddy flow and generates friction between sand grains, thus the washing effect being achieved.

A quantity of water dropped from a clearance between an external edge section of the screw conveyor and an internal wall of the agitation tank is larger than that of the sand, so that a density of sand becomes higher, as it goes to a higher section of the screw, as compared to that when it is deposited on the bottom of the agitation tank. Namely the chance for sand grains to scrub each other in the fluidized sand on the conveyor projecting from a layer of deposited sand becomes higher than that in sand agitated together with water in the deposited section. For this reason, the washing effect caused by scrubbing between sand grains is achieved efficiently, and contaminants deposited on or covering a surface of sand grain can effectively be removed.

When the fluidized sand flows upward on a sloped surface of the screw conveyor, the sand gains each having the substantially same hardness scrub each other due to an eddy flow generated there, but the sand grains seldom collide with a member having higher hardness, so that an excessive force is not loaded to the sand grains and there is no possibility that the sand grains are pulverized. Also when the sand grains collide against the internal wall due to the centrifugal force, the sand grains move together with water, so that the energy generated by collision is rather small, and the change for the sand grains to be pulverized is extremely low. Further as there is always water between sand grains scrubbing each other, separated contaminants are dissolved in the cleaning water, and re-deposition due to scrubbing never occurs. For this reason, the sand cleaning effect becomes higher. In the fluidized sand up-flow section, sand grains contact only a top surface of the agitation vane, so that wearing in the agitation member is rather slight.

It should be noted that a clearance between the external edge section of the screw conveyor and the internal wall of the agitation tank should preferably be at least 3 times or more larger than a gain diameter of sand to prevent the sand grains from being pulverized. The fluidized sand flown up to the upper edge opening of the agitation tank is successively sent into the cleaning tank, and is recycled through the lower edge opening into the agitation tank, and also in the cleaning tank and eddy flow is generated and the washing effect because of scrubbing between sand grains is generated also in this tank. Also in the fluidized sand up-flow section, a portion of sand dropped from the external edge section of the screw conveyor again flows upward, so that the washing step by scrubbing becomes longer with the washing effect improved.

In another embodiment of the present invention, a plurality of wing-shaped agitation vanes are provided substantially in parallel to a screw conveyor surface in the sand up-flow section. This agitation vane has a form like a wing, forms a substantially arcuate curved surface, and a plurality of agitation vanes are provided in the rotating direction of the screw conveyor. The fluidized sand flowing along the curved surface of the agitation vane generates a flow of a fluid and then generates an eddy flow. This eddy flow works to further promote the eddy flow generated by the pushing-up effect of the screw conveyor, so that movement of the sand grains to scrub each other is further promoted with the washing effect improved.

A tip of each agitation vane has a sharp or a slight roundish form to prevent the sand gains from being crushed. Taking into consideration the possibility of pulverization of sand grains or increase of load to the agitation vane, an installation angle of each vane is substantially parallel to a surface of the screw conveyor. It is preferable that the agitation vane is fixed to a supporting bar erecting on the surface of the crew conveyor, and also the fluidized sand grains are eccentrically offset along the eternal periphery, it is preferable for the agitation vanes to be provided in this section. For preventing pulverization of sand grains, a round bar is desired as the support bar, but alternately a plurality of vertical and wing-shaped vanes may be provided in the rotating direction of the screw conveyor.

In the fluidized sand up-flow section, the sand grains mainly contact a top surface of the spiral vane and the wing-shaped agitation vane, and the sand grains flow along these sections, so that the agitation member is worn little.

BRIEF DESCRIPTION OF THE DRAWINGS

FIG. 7 is a schematic view showing a particulate matter washing apparatus according to another embodiment of the present invention in which the side wall of the cleaning tank constitutes the cylindrical wall surrounding the screw conveyor and a circulating path is provided inside the side wall of the cleaning tank.

DESCRIPTION OF THE PREFERRED EMBODIMENTS

Figure 1:
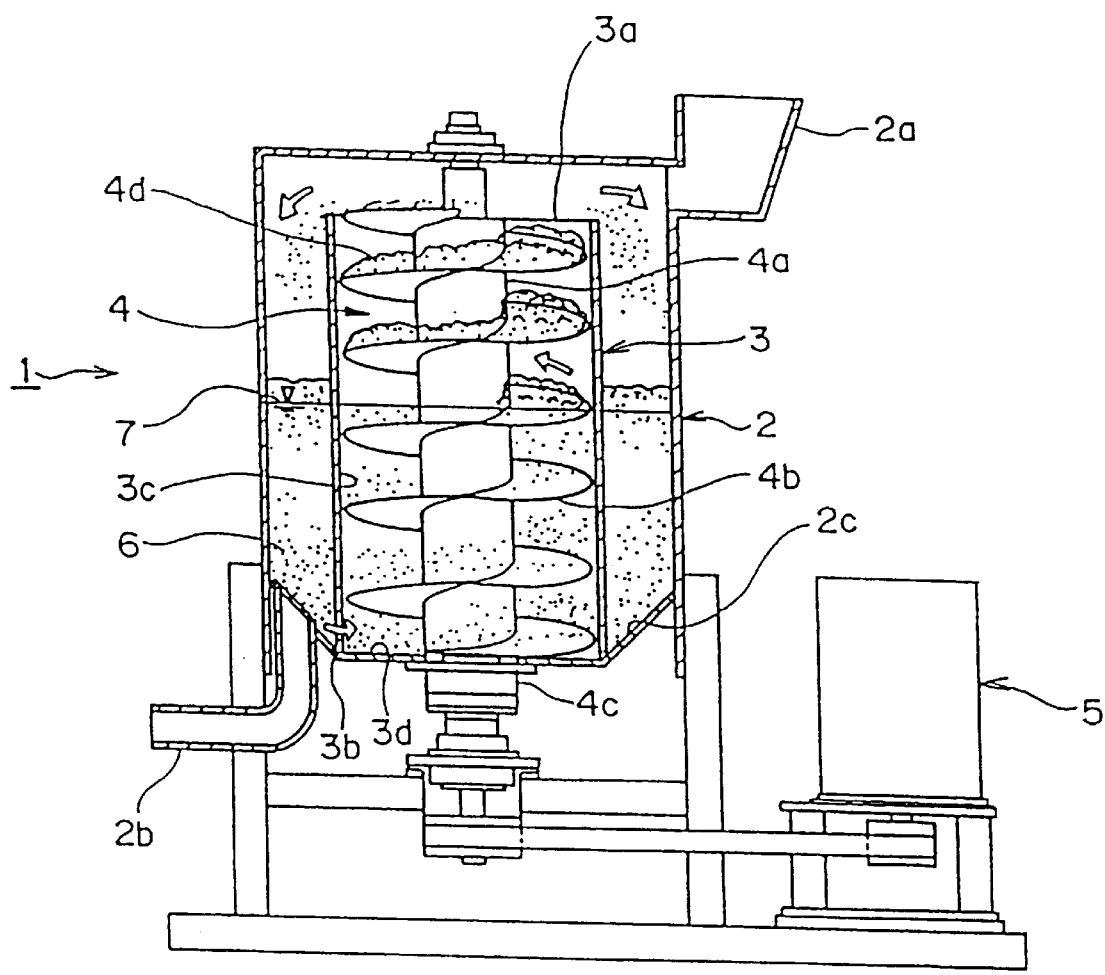
FIG. 1 is a cross-sectional view of a sand washing apparatus according to an embodiment of the present invention.

Next detailed description is made for embodiments of the present invention with reference to the attached drawings. FIG. 1 is a cross-sectional view of the sand washing apparatus according to the present invention. The sand washing apparatus 1 comprises a cleaning tank 2, an agitation tank 3, a screw conveyor 4, and a driving unit 5, and appropriate quantities of contaminated sand 6 and cleaning water are put in the tank in use. The cleaning tank 2 has a sand inlet port 2a in its upper section and a sand outlet port 2b in its lower section with the bottom surface formed in an inclined state so that the deposited contaminated sand 6 is smoothly introduced into the agitation tank 3.

The agitation tank 3 is a cylindrical body provided in the erect posture at a central position of the cleaning tank 2 and has an upper edge opening 3a and a lower edge opening 3b, and a rotary shaft 4a of the screw conveyor 4 is inserted through a central portion thereof. A spiral vane 4b fixed to the rotary shaft 4a has an appropriate gap with an internal surface 3c of the agitation tank 3, and efficiently carries the contaminated sand 6 up to the upper edge opening 3a. If this gap is too large, a quantity of sand dropping while being flown upward becomes larger, and if the gap is too small, it may cause clogging of the gap with sand grains, pulverization of the sand grains, or wearing of the vane 4b, so that the gap must be 3 times or more larger than a gain diameter of sand grains. To enable adjustment of the gap from time to time according to a grain diameter of the contaminated sand which is sand to be washed, the screw conveyor 4 or the agitation tank 3 should preferably be exchangeable.

A pressure chamber 4c is provided under a bottom surface 3d of the agitation tank 3 and a contact section of the rotary shaft 4a. A hydraulic pressure or an air pressure is loaded via a nozzle now shown herein to this pressure chamber 4c to prevent the cleaning water 7 and contaminated sand 6 from being leaked to outside.

The screw conveyor 4 has a section projecting from a layer of the contaminated sand 6 deposited in the agitation tank 3 as well as from a top surface of the cleaning water 7. Namely a total quantity of the contaminated sand 6 and cleaning water 7 put in the agitation tank 3 should be set so that this projecting section is provided. A weight ratio of the contaminated sand 6 against the cleaning 7 should be set to a higher value to insure the higher cleaning effect.

rpm of the crew conveyor 4 should be set to a higher value so that the cleaning water 7 can flow up to an upper edge of the vane 4b. When the driving unit 5 starts its operation, the contaminated sand 6 and cleaning water 7 successively supplied from the lower edge opening 3b of the agitation tank 3 move upward along a surface of the vane 4b and reaches the projecting section, and if the cleaning water 7 still has an upward movement in this step, the contaminated sand 6 is floated, thus fluidization of the sand being realized. In the fluidized sand up-flow section 4d where the fluidized said to be washed is moved upward up to the upper edge opening 3a, the fluidized sand generates a discontinuous eddy flow, and the sand grains scrub each other in the water flow moving upward, so that contaminants deposited on and covering a surface of each gain sand can efficiently be removed.

It should be noted that, although it is necessary to inject the cleaning water 7 at least to a level allowing realization of fluidization of sand in the projecting section, if the quantity of injected cleaning water 7 is excessive, the change for the sand grains to scrub each other becomes lower, so that the efficiency in removal of contaminants drops. Also, if the projecting section is small, the washing efficiency becomes lower, and on the contrary, if the projecting section is too large, an absolute quantity of the sand to be washed becomes smaller with the washing efficiency lowered. For this reason, a total quantity of and a ratio between contaminated sand 6 and cleaning water 7 to be injected must be decided taking all the factors described above into consideration.

Figure 2:
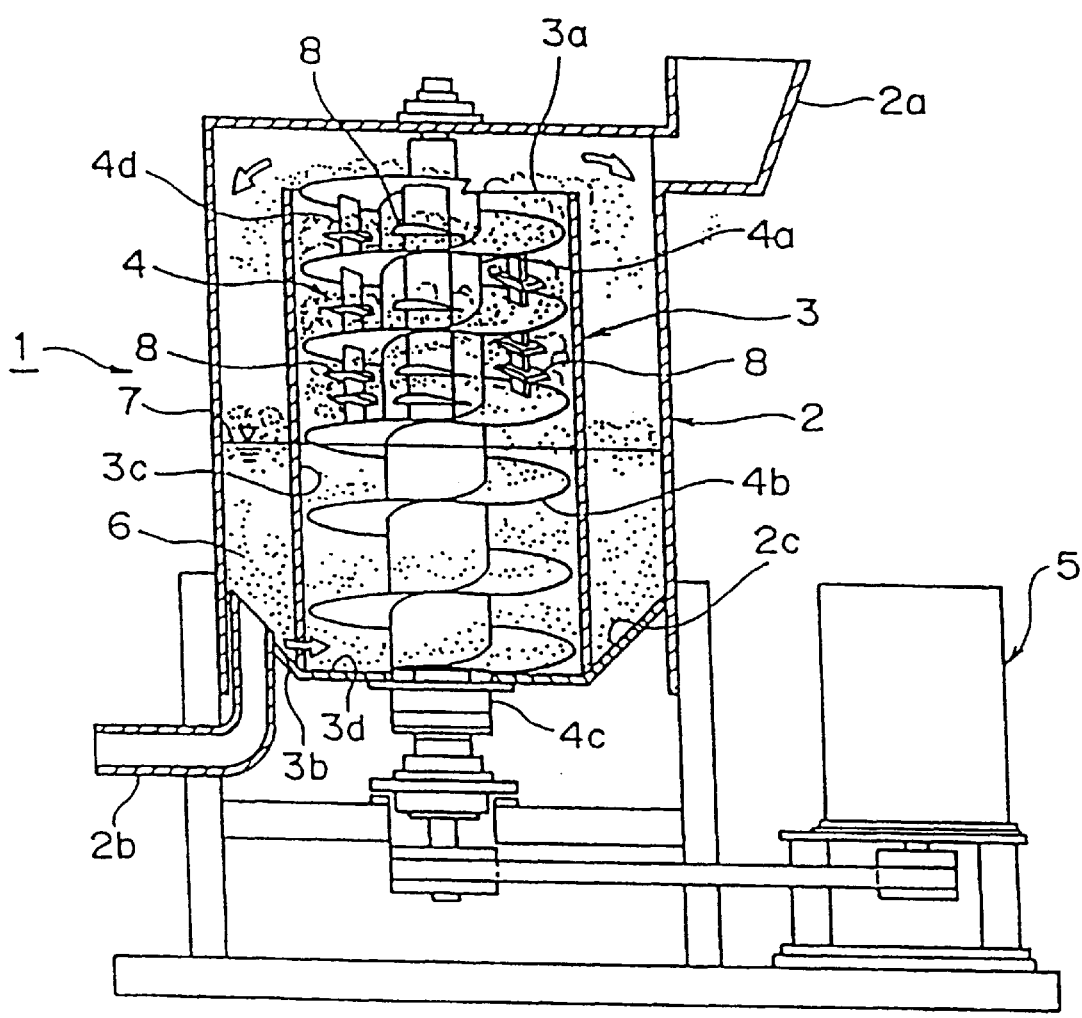
FIG. 2 is a cross-sectional view of a sand washing apparatus according to another embodiment of the present invention.
Figure 3:
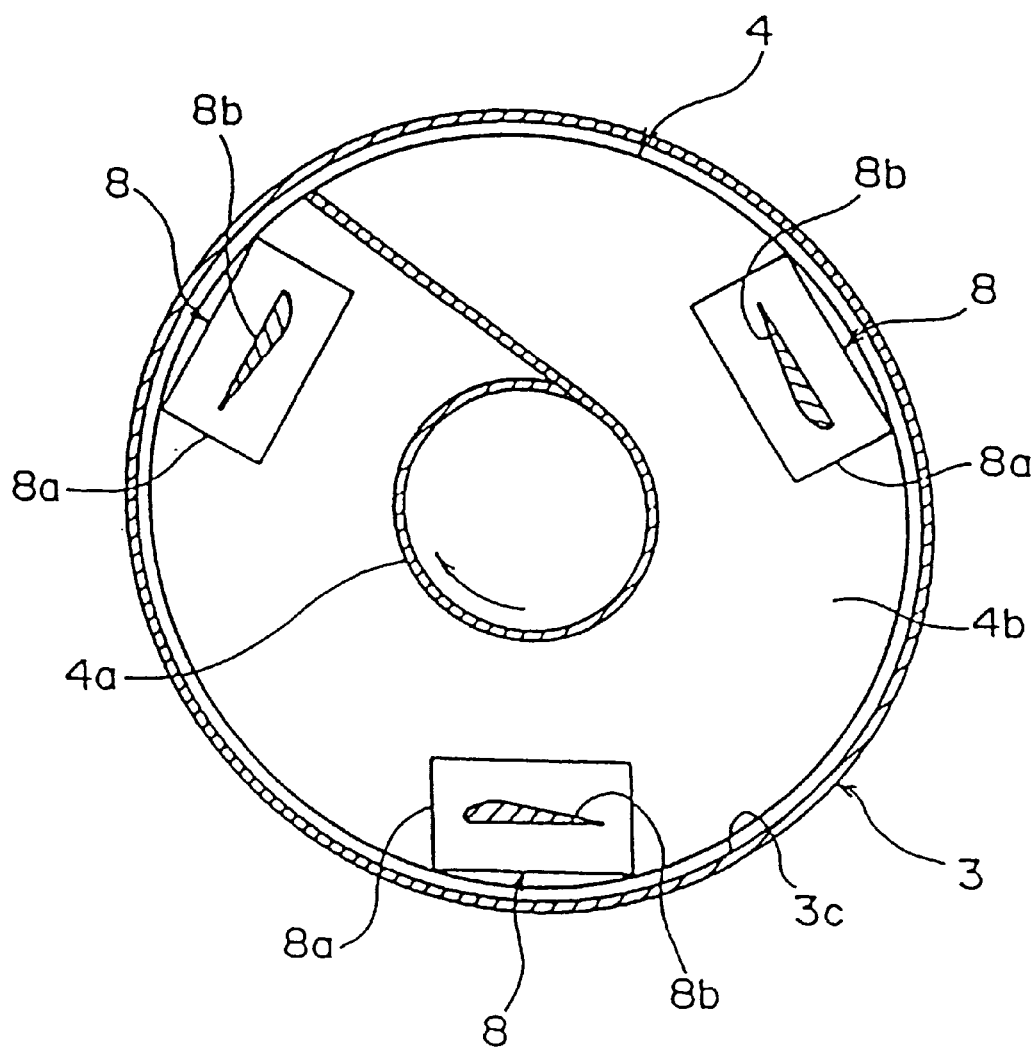
FIG. 3 is a cross-sectional view showing an upper section of the agitation tank.
Figure 4:
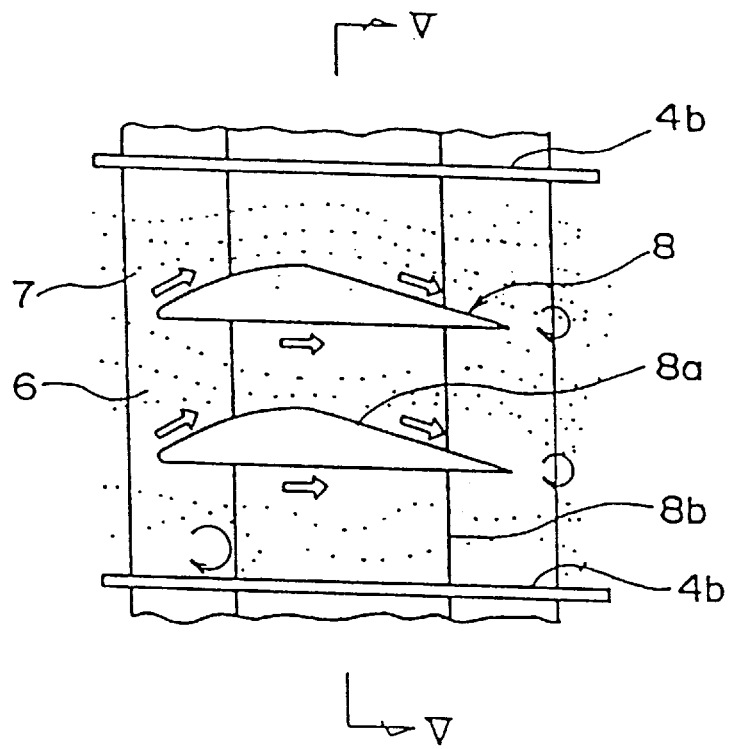
FIG. 4 is a front view of the agitation vane.
Figure 5:
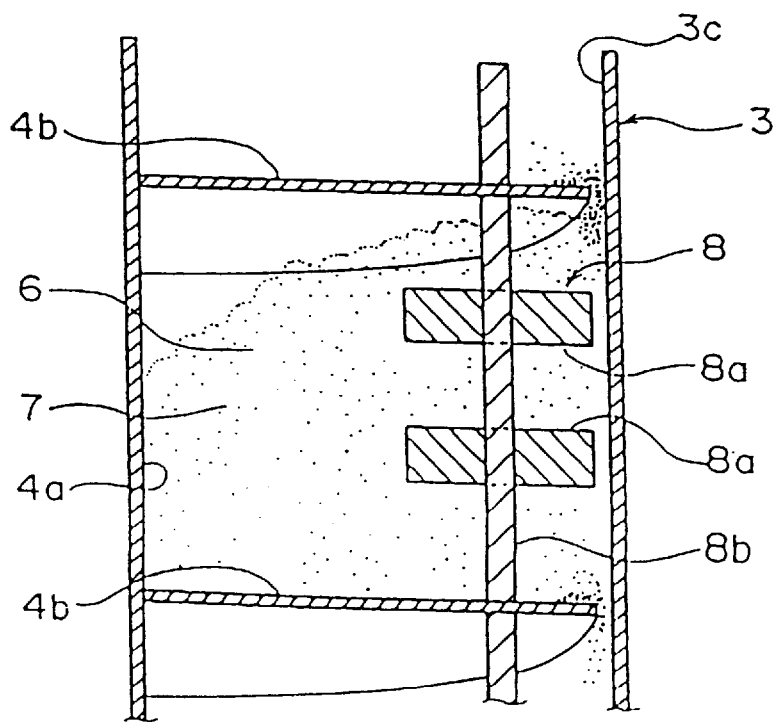
FIG. 5 is a cross-sectional view showing the agitation vane taken along the line V—V in FIG. 4.
Figure 6:
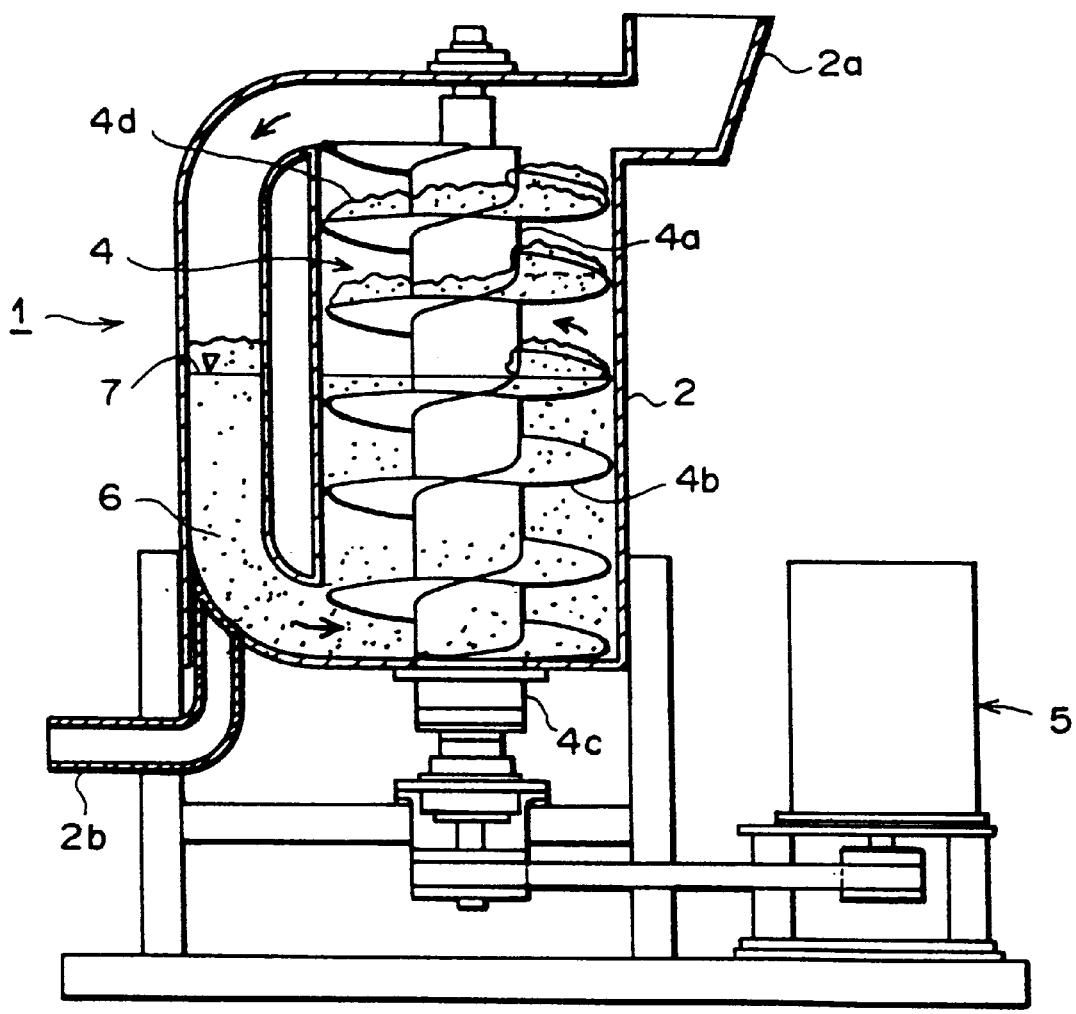
FIG. 6 is a schematic view showing a particulate matter washing apparatus according to another embodiment of the present invention in which the side wall of the cleaning tank constitutes the cylindrical wall surrounding the screw conveyor and a circulating path is provided outside the side wall of the cleaning tank.

Next, the sand washing apparatus according to another embodiment of the present invention is described below with reference to FIG. 2 to FIG. 5. FIG. 2 is a cross-sectional view of the sand washing apparatus according to another embodiment of the present invention, FIG. 3 is a cross-sectional view of an upper section of the agitation tank, FIG. 4 is a front view of the agitation vane, FIG. 5 is a cross-sectional view of the sand washing apparatus taken along the line V—V in FIG. 4. It should be noted that the same reference numerals are assigned to members having the same configuration or effects as those showing in FIG. 1, and description thereof is omitted thereon.

In FIG. 2, an agitation vane 8 is attached to the vane 4b of the screw conveyor 4 projecting from a top surface of the deposited contaminated sand 6 as well as from a top surface of the cleaning water 7. The agitation vanes 8 are allocated at symmetrical positions around a center in the external peripheral section with the wing 8a having a substantially arcuated surface set substantially in parallel to the vane 4b in the rotating direction of the screw conveyor 4. In this embodiment, the agitation vane 8 is fixed to the supporting bar 8b provided between the vanes 4b, but the agitation vane 8 may be attached to a supporting bar projecting in the radial direction from the rotary shaft 4a. Further, although, the supporting bar 8b is a vertical agitation vane having a shape like a wing and provided in the same direction as the vane 8a, but a form of the supporting bar is not limited to that described above, and a round bar may be used for the purpose.

Further the fluidized sand flowing along a curved surface of the vane 8a of the agitation vane 8a generates separation of the fluid as shown in FIG. 4, and generates an eddy flow at the rear side therefrom. This eddy flow further promotes the eddy flow generated because of the pushing-up effect by the screw conveyor 4, so that the scrubbing effect between the sand grains is promoted with the washing effect improved.

The fluidized sand having been moved to the upper edge opening 3a of the agitation tank 3 is sent out into the cleaning tank 2 successively, and then passes through the lower edge opening 3b and is again recycled into the agitation tank 3 because of the tare weight, and while dropping, an air is involved in the flow of the cleaning water 7, the sand grains moved upward due to the involved air and dropping sand gains generated an irregular eddy flow, and the scrubbing effect between sand grains is generated also in this section.

Next description is made for a case where contaminated sand was washed by using the sand washing apparatus described above. The sand washing apparatus used in the experiment was that shown in FIG. 1. The contaminated sand washed by this apparatus had the cleaning turbidity of 1150 degrees, an effective diameter of 0.513 mm, and a homogeneity coefficient of 1.532, and was put in a vessel having the capacity of 430 litters together with a specified quantity of cleaning water. Table 1 shows a relation between rpm of the screw conveyor and the cleaning turbidity. It should be noted that the cleaning turbidity shown in Table 1 was measured in 30 minutes after agitation, and the frequency of 40 MHz corresponds to around 90 rpm.

TABLE 1

| No | Water (l) | Sand (kg) | Sand (l) | Screw conveyor Frequency (Hz) | Cleaning turbidity (degree) |
|---|---|---|---|---|---|
| 1-1 | 100 | 100 | 74 | 40 | 17.4 |
| 1-2 | " | " | " | 50 | 20 |
| 1-3 | " | " | " | 60 | 12.8 |
| 2-1 | " | 200 | 148 | 40 | 21 |
| 2-2 | " | " | " | 50 | 16.9 |
| 2-3 | " | " | " | 60 | 14.7 |
| 2-4 | " | " | " | 70 | 14.4 |
| 3-1 | " | 300 | 220 | 60 | 18.4 |
| 3-2 | " | " | " | 75 | 12.9 |

As described above, in each of the cases where a ratio of water vs sand is changed, generally the cleaning turbidity becomes lower as the frequency is made higher. Also a relation between the frequency in this apparatus and the water pumping-up height or the sand pumping-up height is shown in Table 2, and it can be considered that it is preferable to inject the sand and cleaning water up to a volume which is equivalent to around ½ to ⅔ of the total capacity of the vessel (around 210 to 280 litters) and to rotate the screw conveyor at a frequency of around 60 Hz for the purpose to obtain a water pumping-up height sufficient for washing (H0/3 to H0/21; H0=a height of the vessel).

TABLE 2

| | Pumping-up stroke | |
|---|---|---|
| Hz | Water pumping-up height | Sand pumping-up height |
| 40 | H0/4 | — |
| 55 | H0/3 | H0/2 |
| 65 | H0/2 | 3 H0/4 |

Then, a relation between a frequency and the cleaning turbidity in a case where a total quantity of sand and water is larger and the fluidized sand up-flow section is extremely small is shown in Table 3.

TABLE 3

| No | Water 200 l Frequency (Hz) | Sand 300 kg (220 l) Cleaning turbidity (degree) |
|---|---|---|
| 4-1 | 70 | 18.1 |
| 4-2 | 75 | 21 |
| 4-3 | 80 | 19.1 |
| 4-4 | 85 | 17 |
| 4-5 | 90 | 19.9 |

As described above, when agitating, if the fluidized sand up-flow section becomes H0/4 or below, the cleaning turbidity can not be lowered even if the frequency is made higher, and it hardly becomes below 19 degrees. For this reason, to effectively lower the cleaning turbidity to around 14 degrees or below with this sample, it is preferable to keep a total value of the sand and cleaning water in agitation in a range from around ½ to ⅔ of the total capacity of the vessel and also to set the frequency to around 60 Hz.

As for distribution of granularity of sand grains after cleaning, the grain does not change even if washed at a high speed with the frequency of 90 Hz. As described above, the apparatus agitating contaminated sand with a screw conveyor does not cause at least pulverization of sand grains.

Next description is made for an example in which contaminated sand was washed by using the sand washing apparatus shown in FIG. 2. The contaminated sand washed by this apparatus has the cleaning turbidity of 1150 degrees, soluvability in hydrochloric acid of 2.93%, effective grain diameter of 0.583 mm, and homogeneity coefficient of 1.420. 200 Kg contaminated sand and 100 Kg cleaning water were injected into a vessel with the capacity of 420 litters, and the contaminated sand was washed at the rotational speed of 159 rpm (70 Hz) for 30 minutes. Further for comparison, the same experiment was carried out under the same conditions with a conventional type of sand washing machine and the sand washing apparatus not having any agitation vane shown in FIG. 1. It should be noted that the conventional type of sand washing machine was of a type in which contaminated sand was forcefully agitated together with water in an agitation tank.

TABLE 4

| | Sand washing apparatus with agitaion vane | Sand washing apparatus without agitaion vane | Conventional type of sand washing machine |
|---|---|---|---|
| Cleaning turbidity Degree | | | |
| Before cleaning | 1150 | 1150 | 1150 |
| In 10 minutes after cleaning | 11.5 | 17.4 | 73 |
| In 30 minutes after cleaning | 4.7 | 10.8 | 63 |
| Soluvability in hydrochloric acid % | | | |
| Before cleaning | 2.93 | 2.92 | 2.92 |
| In 10 minutes after cleaning | 1.65 | 2.01 | 2.36 |
| In 30 minutes after cleaning | 0.97 | 1.52 | 2.07 |
| Effective grain diameter mm | | | |
| Before cleaning | 0.583 | 0.587 | 0.592 |
| In 10 minutes after cleaning | 0.589 | 0.590 | 0.584 |
| In 30 minutes after cleaning | 0.587 | 0.587 | 0.570 |
| Homogeneity coefficient | | | |
| Before cleaning | 1.420 | 1.419 | 1.419 |
| In 10 minutes after cleaning | 1.419 | 1.417 | 1.426 |
| In 30 minutes after cleaning | 1.417 | 1.415 | 1.445 |

As shown in Table 4, the cleaning turbidity after washing with the sand washing apparatus according to the present invention was 4.7, which was around 1/13 as compared to that when washed with the conventional type of sand washing machine, and was half or below as compared to that achieved when the sand washing apparatus without any agitation vane. Also the soluvability in hydrochloric acid when washed with the sand washing apparatus according to the present invention was ½ of that achieved by the conventional type of sand washing machine, and around 1/1.5 achieved by the sand washing apparatus without any agitation vane, which indicates that separation of the sludge from the sand was promoted. On the other hand, when the conventional type of sand washing machine was used, the effective grain diameter reduced from 0.592 to 0.570, while the homogeneity coefficient increased from 1.419 to 1.445, which indicates that the sand gains were pulverized and the homogeneity was lost after washing, but in cases of the sand washing apparatus according to the present invention and sand washing apparatus without any agitation vane, both the effective diameter and homogeneity coefficient were not substantially changed, which indicates that pulverization did not occur.

EFFECTS OF THE INVENTION

As described above, the sand washing apparatus according to the present invention has a fluidized sand up-flow section provided in the screw conveyor, so that the fluidized sand generated a discontinuous eddy flow, which generates friction between sand gains with the cleaning effect achieved. For this reason, contaminants deposited on or covering a surface of a grain sand can effectively be removed. Also the fluidized sand shows the scrubbing effect between the sand grains, but the sand grains little collide against members having a higher hardness, so that an excessive force causing pulverization is not loaded to the sand grains. In addition, there is always cleaning water between sand grains, so that contaminants separated from a surface of each sand grain are dissolved in and flown away with the water. Further only a top surface of the vane contact the sand in the fluidized sand up-flow section, so that the agitation member is worn little.

Also in the sand washing apparatus according to one embodiment, a wing-shaped agitation vane is provided in the fluidized sand up-flow section, so that the fluidized sand flowing along a curved surface of the agitation vane generated an eddy flow, which further promotes an eddy flow generated by the pushing-up effect by the screw conveyor, and also scrubbing between the sand grains is promoted with the cleaning effect further improved.

In another embodiment of the present invention, the agitation vane is fixed to a supporting bar and is provided in an external peripheral section of the conveyor, so that it can effectively agitate the fluidized sand eccentrically offset by the centrifugal force. In another embodiment of the present invention, the supporting bar is a vertical agitation vane having a form like a wing, and it can increase chances of generation of an eddy flow.

What is claimed is:

1. A method of washing contaminated particulate matter comprising:

providing a cleaning tank, for storing the contaminated particulate matter and cleaning water, in which the contaminated particulate matter and the cleaning water are contained in their respective predetermined amounts and in which a screw conveyor is disposed for rotation around a substantially vertical axis so that the lower part of the screw conveyor is positioned under the surface of the cleaning water contained in the cleaning tank and the upper part of the screw conveyor is positioned above the surface of the cleaning water in the cleaning tank;

contacting, under the surface of the water, the grains of the particulate matter with each other with sludge, which comes from the contaminated particulate matter and is present in the water, being interposed therebetween to remove at least a part of contamination substances from the surface of the grains of the particulate matter and to wash off the substances into the water, while raising the particulate matter and the water by means of the rotation of the screw conveyor under the surface of the water;

fluidizing, above the surface of the water, the particulate matter on the surface of the screw conveyor and thereby contacting the grains of the particulate matter with each other with a slight amount of the water including the sludge being interposed therebetween to remove at least a part of the remaining contamination substances from the surface of the grains of the particulate matter; and allowing the particulate matter, which has been raised, to fall down to the lower part of the screw conveyor through a way outside the screw conveyor;

whereby the contaminated particulate matter is cleaned off by way of repeating the raising and falling.

2. The method of claim 1, wherein the particulate matter is dropped onto the surface of the water in the cleaning tank when the particulate matter is allowed to fall down.

3. A method of claim 2, wherein the water is not replaced until the washing of the particulate matter is completed.

4. A method of claim 2, wherein a part of the water is replaced with unused water during the washing of the particulate matter.

5. A method of claim 2, wherein the surface of the water is maintained at a height ranging from ½ to ⅔ of the height of the screw conveyor.

6. A method of claim 2, wherein the screw conveyor is rotated at a speed so as to raise the water to the top of the screw conveyor.

7. A method of claim 2, wherein the particulate matter is sand.

8. The method of claim 1, wherein the water is not replaced until the washing of the particulate matter is completed.

9. A method of claim 8, wherein the surface of the water is maintained at a height ranging from ½ to ⅔ of the height of the screw conveyor.

10. A method of claim 8, wherein the screw conveyor is rotated at a speed so as to raise the water to the top of the screw conveyor.

11. A method of claim 8, wherein the particulate matter is sand.

12. The method of claim 1, wherein a part of the water is replaced with unused water during the washing of the particulate matter.

13. The method of claim 1, wherein the surface of the water is maintained at a height ranging from ½ to ⅔ of the height of the screw conveyor.

14. The method of claim 1, wherein the screw conveyor is rotated at a speed so as to raise the water to the top of the screw conveyor.

15. The method of claim 1, wherein the particulate matter is sand.

* * * * *